United States Patent
Eliseev et al.

(10) Patent No.: US 9,110,316 B2
(45) Date of Patent: Aug. 18, 2015

(54) METHOD OF AMPLIFYING MAGNETO-OPTICAL KERR EFFECT BY USING PHOTON CRYSTAL STRUCTURES, AND PHOTON CRYSTAL HAVING AMPLIFIED MAGNETO-OPTICAL KERR EFFECT, METHOD OF FABRICATING PHOTON CRYSTAL

(71) Applicants: SAMSUNG ELECTRONICS CO., LTD, Suwon-si (KR); FACTORY OF NEW MATERIALS LLC, Moscow (RU)

(72) Inventors: Andrey Anatolevich Eliseev, Moscow (RU); Nina Aleksandrovna Sapoletova, Moscow (RU); Kirill Sergeevich Napolskiy, Moscow (RU); Andrey Anatolevich Grunin, Moscow (RU); Andrey Anatolevich Fedyanin, Moscow (RU)

(73) Assignees: SAMSUNG ELECTRONICS CO., LTD., Suwon-si (KR); FACTORY OF NEW MATERIALS LLC, Moscow (RU)

(*) Notice: Subject to any disclaimer, the term of this patent is extended or adjusted under 35 U.S.C. 154(b) by 34 days.

(21) Appl. No.: 13/690,749

(22) Filed: Nov. 30, 2012

(65) Prior Publication Data

US 2013/0141773 A1 Jun. 6, 2013

(30) Foreign Application Priority Data

Dec. 1, 2011 (RU) .................. 2011148915
Nov. 29, 2012 (KR) .................. 10-2012-0137282

(51) Int. Cl.

| G02F 1/09 | (2006.01) |
|---|---|
| G02F 1/03 | (2006.01) |
| G02F 1/07 | (2006.01) |
| G02F 1/00 | (2006.01) |
| C25D 1/00 | (2006.01) |
| C25D 1/04 | (2006.01) |
| C25D 1/08 | (2006.01) |

(52) U.S. Cl.
CPC .. *G02F 1/09* (2013.01); *C25D 1/00* (2013.01); *C25D 1/006* (2013.01); *C25D 1/04* (2013.01); *C25D 1/08* (2013.01); *G02F 1/0036* (2013.01); *G02F 2202/32* (2013.01)

(58) Field of Classification Search
CPC ...... A61B 18/20; A61B 18/201; A61B 18/22; A61B 18/28; A61B 2017/00017; A61B 2017/00057; A61B 2017/00084; A61B 2018/00636; A61B 2018/00642; G02B 2006/12097; G02B 2006/12195; G02B 6/1223; G02B 6/01
USPC ......... 359/258, 280, 282, 284, 286, 315, 322, 359/324, 321
See application file for complete search history.

(56) References Cited

U.S. PATENT DOCUMENTS 7,826,131 B2 * 11/2010 Arsenault et al. ............. 359/318
7,965,436 B2    6/2011 Sigalas et al.
(Continued)

FOREIGN PATENT DOCUMENTS

| JP | 2006-099926 A | 4/2006 |
|---|---|---|
| JP | 4093281 B2 | 6/2008 |

OTHER PUBLICATIONS

Granovskii, A.B. et al., "Magnetorefractive effect in Nanstructures, Manganites and Magnetophotonic Crystals Based on These Materials", Mar. 23, 2007, pp. 1065-1071, vol. 52, No. 9, Pleiades Publishing, Inc.

*Primary Examiner* — Stephone B Allen
*Assistant Examiner* — Brandi Thomas
(74) *Attorney, Agent, or Firm* — Sughrue Mion, PLLC

(57) ABSTRACT

A method of amplifying a magneto-optical Kerr effect by using photon crystal structures, and a photon crystal having an amplified magneto-optical Kerr effect, and a method of fabricating the photon crystal. The method of amplifying a magneto-optical Kerr effect by using photon crystal structures includes amplifying the magneto-optical Kerr effect by fabricating a magnetic photon crystal including a crystal magnet and using a periodically-structured surface of the crystal magnet.

28 Claims, 4 Drawing Sheets

(56) References Cited

U.S. PATENT DOCUMENTS

| | | | |
|---|---|---|---|
| 2002/0118941 A1* | 8/2002 | Notomi et al. | 385/129 |
| 2004/0036814 A1* | 2/2004 | Yamaguchi | 349/2 |
| 2005/0122568 A1* | 6/2005 | Aoki et al. | 359/321 |
| 2006/0137601 A1* | 6/2006 | Miguez et al. | 117/35 |
| 2009/0022996 A1* | 1/2009 | Lee et al. | 428/428 |
| 2009/0219602 A1 | 9/2009 | Alameh et al. | |
| 2013/0121358 A1* | 5/2013 | Hirose et al. | 372/44.011 |

* cited by examiner

METHOD OF AMPLIFYING MAGNETO-OPTICAL KERR EFFECT BY USING PHOTON CRYSTAL STRUCTURES, AND PHOTON CRYSTAL HAVING AMPLIFIED MAGNETO-OPTICAL KERR EFFECT, METHOD OF FABRICATING PHOTON CRYSTAL

CROSS-REFERENCE TO RELATED PATENT APPLICATIONS

This application claims priority from Russian Patent Application No. 2011148915, filed on Dec. 1, 2011 in the Russian Intellectual Property Office, and Korean Patent Application No. 10-2012-0137282, filed on Nov. 29, 2012 in the Korean Intellectual Property Office, the disclosures of which are incorporated herein by reference in their entirety.

BACKGROUND

1. Field

Embodiments relate to magneto-photonics and a nanotechnology field, and more particularly, to methods of amplifying magneto-optical effects.

2. Description of the Related Art

Properties and application methods with respect to magneto-photon materials have been researched and developed for many decades (e.g., A. B. Granovskii, E. A. Gan'shina, A. N. Yurasov, Yu. V. Boriskina, S. G. Yerokhin, A. B. Khanikaev, M. Inoue, A. P. Vinogradov, Yu. P. Sukhorukov, *Magneto-refractive effect in nanostructures, manganite and magneto-photonic crystals*, Radiotekhnika i Elektronika, Vol. 52, No. 9, pp. 1152-1159 (2007)). Magneto-photon materials can be used in making optoelectronic devices, communication systems and a computer technology which are controlled by a magnetic field. Separately, there has also been research conducted on the application of inverted opals based on metals and alloys with respect to magnetoplasmonics, particularly, with respect to the manufacture of plasmon circuits.

The magneto-optical effects created by rotating a polarization plane of a light beam that is transmitted through a transparent medium in a magnetic field (Faraday effect) or reflected from a magnetized medium (Kerr effect) were relevant only in a purely theoretical way for a long time due to small values of rotation angles of the polarization plane. However, in recent decades, important and practical applications have been found. Recently, interest with respect to the magneto-optical effects has increased due to their applications in the fields of physics, optics and electronics.

A feature of the magneto-optical effects is non-reciprocity, i.e. a disturbance of a reversibility principle of a light beam. A change in a reverse direction of the light beam results in the same rotation angle of a polarization plane in the same direction on a "forward" trajectory. Therefore, the magneto-optical effects are accumulated by repeatedly transmitting the light beam that passes through a magnetic material. Multiple reflections of the light beam in a medium are possible because of a dielectric constant of a material which is spatially modulated. The material (that has become recently widely known as a photon crystal) has photon forbidden zones which occur due to repeated Bragg reflection of electromagnetic waves on a periodic disturbance of a dielectric constant and may be used to magnify an interaction efficiency of light with a medium. In this regard, magnetic inverted opals have created interest related to a capability of making optical devices to be controlled by an external magnetic field based on the magneto-optical effects.

The value of the Kerr effect can be defined as an efficiency of interaction between light and a magnetized material. Although light is strongly reflected from a conductor below a frequency of plasma oscillations, the light penetrates with a depth of a skin-layer that is a limit in which interaction with a material occurs. Here, the frequency of the plasma oscillations may be given, in an SGS system, as $\omega p \approx (4\pi n e2/m)^{1/2}$ where n indicates a conduction electron density, e indicates a charge, and m indicates an electronic mass. Also, the depth of the skin-layer may be $\delta = c/(2\pi\sigma\mu\omega)^{1/2}$ ($\sigma$—specific conductivity). Thus, a plasmon-polarized wave that represents interconnected oscillations of electrons and an electromagnetic field may be on a metal surface, as a result of interaction between the light and the free charge carriers. The plasmon-polarized wave that occurs on the metal surface results in amplification of the interaction between the light and the material. The more the plasmon-polarized wave is effectively generated, the more the Kerr effect is strongly displayed.

The plasmon-polarized wave on and under the metal surface is defined by Equations 1 and 2.

$$E_z^{(1)}(x,z) = E_0 \exp(-\alpha_1 z) \exp(ik_P x), \quad \text{(Equation 1)}$$
$$E_z^{(2)}(x,z) = E_0 \exp(\alpha_2 z) \exp(ik_P x),$$

$$k_P = \left(\frac{\omega}{c}\right)\sqrt{\frac{\varepsilon_1 \varepsilon_2}{\varepsilon_1 + \varepsilon_2}}, \quad \text{(Equation 2)}$$

$$\alpha_{1,2} = \left(\frac{\omega}{c}\right)\sqrt{-\frac{\varepsilon_{1,2}^2}{\varepsilon_1 + \varepsilon_2}}.$$

Here, $k_p$ indicates a wave number of the plasmon-polarized wave, $\varepsilon_1$ indicates a dielectric constant of a medium on metal ($\varepsilon_1 > 0$, in vacuum $\varepsilon_1 = 1$), and $\varepsilon_2$ indicates a dielectric constant in the metal ($\varepsilon_2 < 0$, $|\varepsilon_2| > \varepsilon_1$). A modulus of the dielectric constant $\varepsilon_2$ of the metal is decreased with growth of a frequency, and the decrease results in deviation of $\omega(kp)$ of the plasmon-polarized wave from a linear dependence. However, branches $\omega(k)$ for usual light and $\omega(kp)$ for the plasmon-polarized wave do not directly cross each other, and thus, it is impossible to achieve an impulse of light $k \cdot \sin \theta = k_p$ that is a requirement to preserve a component in parallel with the metal surface (where $\theta$ indicates an incidence angle of a light beam). However, if the metal has a periodic structure with a period $G = 2\pi/d$ in a k-space (where d indicates a structure period in a direct space) in an X-axis direction, the wave numbers that differ from each other in a value G may be physically equivalent and thus excitation of the plasmon-polarized wave may have a wave number $k_p$ that satisfies Equation 3 below.

$$k \sin \theta = k_p \pm G \quad \text{(Equation 3)}$$

In a more general case, $k \cdot \sin \theta = k_p + mG$, in Equation 3, where m indicates an arbitrary integer. In particular, the requirement of Equation 3 may be achieved by a wave length given via Equation 4.

$$\lambda_{Wood} = d\left(\sqrt{\frac{\varepsilon_1 \varepsilon_2}{\varepsilon_1 + \varepsilon_2}} + \sin\theta\right) \quad \text{(Equation 4)}$$

In this case, effective generation of the plasmon-polarized wave on the metal surface leads to a 'Wood feature' that is a sharp decrease in intensity of a reflected light which causes a minimum value in a reflection spectrum.

Thus, there is a theoretical basis for the concept that the magneto-optical Kerr effect may be amplified by making a periodically-structured surface of a magnetic material, in particular, a magnetic inverted opal.

Recently, several examples with respect to the use of photon-crystal mediums that amplify interaction between light and a medium have been developed. However, these examples are restricted by the use of photon crystals in refracting optics, whereas the technology of reflecting optics based on photon crystals has not been practically developed. The methods of forming photon-crystal reflecting surfaces, which are applied at present, have insufficient flexibility, and thus do not provide an exact control of surface morphology or a desired application with respect to lithographic approaches which predetermine a complex application of photon-crystal structures as optical components based on reflection that can be controlled by an external field.

U.S. Pat. No. 7,965,436 discloses a device, performing rotation of a polarization plane of light and method of its manufacturing. The disclosed device is characterized by the following features: the device consists of a nonmagnetic dielectric wave guide and a magnetic shell around the nonmagnetic dielectric wave guide; a nonmagnetic wave guide is the siliceous photon crystal obtained by perforation via a lithographic technology; a thickness of a photon crystal lies within a range from 50 to 400 nanometers, and perforation has a periodic structure along an axis of a wave guide and has a period from 200 to 800 nanometers, and each hole has a diameter from 50 to 100 nanometers; and a device having a length of two micrometers performs circular rotation of a polarization plane of the wave transmitted on the wave guide by 45 degrees.

The disclosed solution has been chosen as a prototype to be used in a method of amplifying a magneto-optical Kerr effect by using the photon-crystal structures. However, the disclosed solution cannot be applied to amplify interactions between light and a medium at reflection.

SUMMARY

The exemplary embodiments provide a method of amplifying the efficiency of interactions between light and a medium at reflection, and more particularly, provide a solution to the technical problem on development of a method of amplifying a magneto-optical Kerr effect at reflection on surfaces of magnetic materials.

According to an aspect of an exemplary embodiment, there is provided a method of amplifying a magneto-optical Kerr effect, the method including operations of fabricating a magnetic photon crystal including a crystal magnet having a periodically-structured surface, and amplifying the magneto-optical Kerr effect by using the periodically-structured surface of the crystal magnet.

The amplifying of the magneto-optical Kerr effect may be achieved by fabricating a magnetic inverted photon crystal. The magnetic inverted photon crystal may be obtained by structuring a magnetic material on a submicron level as a result of metal electrodeposition in pores of a synthetic colloidal crystal with a period of a structure from 250 to 1900 nanometers with the subsequent removal of the synthetic colloidal crystal. The magnetic photon crystal may be a film with a thickness of 0.1 to 60 micrometers. Also, the magnetic inverted photon crystal may consist of Ni, Co, Fe or alloys containing these metals.

Surface morphology of the magnetic photon crystal may be determined by a cut level of the closest face-centered cubic packing of microspheres in a plane within a layer of the colloidal crystal.

A degree of filling metal into the pores of the synthetic opal (i.e., hollows of the colloidal crystal) may exceed 95%.

Heterogeneity of a cut level of an external layer of the magnetic photon crystal within a layer may not exceed 10% of the structure period in one square centimeter.

A structure of the magnetic inverted photon crystal may be controlled by using a reflection spectroscopy device during the metal electrodeposition.

A maximal reflection position in spectrums of the magnetic photon crystal within the range of 300 to 2000 nanometers may be determined by the surface morphology of an external layer of the magnetic photon crystal and may linearly increase with magnification of the cut level of the closest face-centered cubic packing of microspheres within the layer of the colloidal crystal.

It is noted that the method of amplifying a magneto-optical Kerr effect achieves reflection optics having an improved rotation of a polarization plane under an influence of an external magnetic field. According to an embodiment, a method includes an operation of fabricating the magnetic inverted photon crystal by creating a periodically-structured surface of a magnet, e.g., by using a template method including an operation of filling pores of the colloidal crystal with a magnetic material by performing electrochemical deposition with a spectroscopic control.

The magnetic photon crystal may have a cut level equal to a structure of a half period of the crystal magnet and thus may achieve over 5-fold amplification of an equatorial magneto-optical Kerr effect.

The magnetic photon crystal may be a crystal magnet having a structure of a magnetic inverted photon crystal, and the magneto-optical Kerr effect may be amplified by periodically structurizing the surface of the crystal magnet.

According to an aspect of another exemplary embodiment, there is provided a method of fabricating a magnetic photon crystal, the method including operations of forming a colloidal crystal; performing metal electrodeposition on pores of the colloidal crystal; and removing the colloidal crystal and thus forming a crystal magnet having a structure of an inverted colloidal crystal, wherein a magneto-optical Kerr effect is amplified by periodically structurizing a surface of the crystal magnet.

According to the method of amplifying a magneto-optical Kerr effect by using photon crystal structures according to the embodiments, it is possible to obtain a magnetic-optical material having a magneto-optical Kerr effect that is amplified at least 5 times, whereby a practical photon crystal device may be achieved.

BRIEF DESCRIPTION OF THE DRAWINGS

The above and/or other aspects will become more apparent by describing in detail exemplary embodiments with reference to the attached drawings in which.

DETAILED DESCRIPTION OF THE EMBODIMENTS

Figure 1:
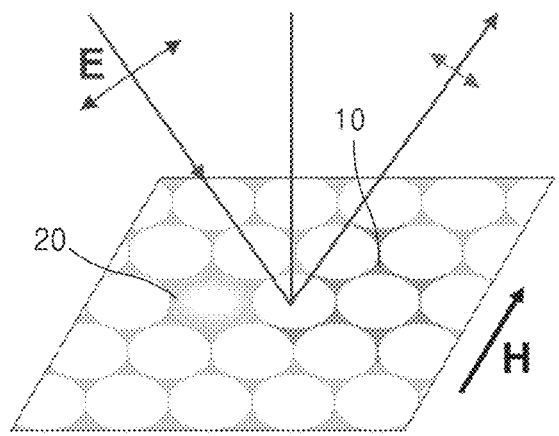
FIG. 1 shows the scheme of occurrence of a magneto-optical Kerr effect with respect to a structured surface of a magnetic inverted opal in which excitation of localized and delocalized surface plasmons occurs, according to an embodiment.

Hereinafter, embodiments will be described in detail with reference to the attached drawings. In the drawings, like reference numerals in the drawings denote like elements, and the size of each component may be exaggerated for clarity.

A method of amplifying a magneto-optical Kerr effect by using photon crystal structures according to one or more embodiments may be performed during the fabrication of photon crystals.

First, a synthetic colloidal crystal is synthesized. The synthetic colloidal crystal may be synthesized by using a method in which polystyrene microspheres or silicon dioxide microspheres (diameter from 200 to 1900 nanometers, distribution by a size no more than 10%) at the application of potential are vertically deposited on a silicon substrate with a sprayed layer of gold having a thickness of 200 nanometers.

Sample films of the magnetic inverted opals may be formed via electrodeposition by which metal is deposited in pores of the synthetic colloidal crystal. The electrodeposition may be performed at room temperature in a three-electrode cell in a potentiostational mode from neutral electrolytes containing a corresponding device. When hollows of polystyrene colloidal crystals are electrochemically deposited, an ethanol (up to 30%) is added in an electrolyte so as to improve wetting of microspheres of polystyrene. A saturated silver-chlorine (Ag/AgCl) electrode that is connected with a cell via a Luggin capillary is used as a reference electrode. A growth of the magnetic inverted photon crystal is achieved layer-by-layer, and a position of a front of the growth is controlled by a reflection spectroscopy device during metal deposition. When the electrochemical deposition is performed for this purpose, the shooting of a reflection spectrum of a material is performed while an incidence angle of light on a sample is varied from 0 to 45°.

Figure 2A:
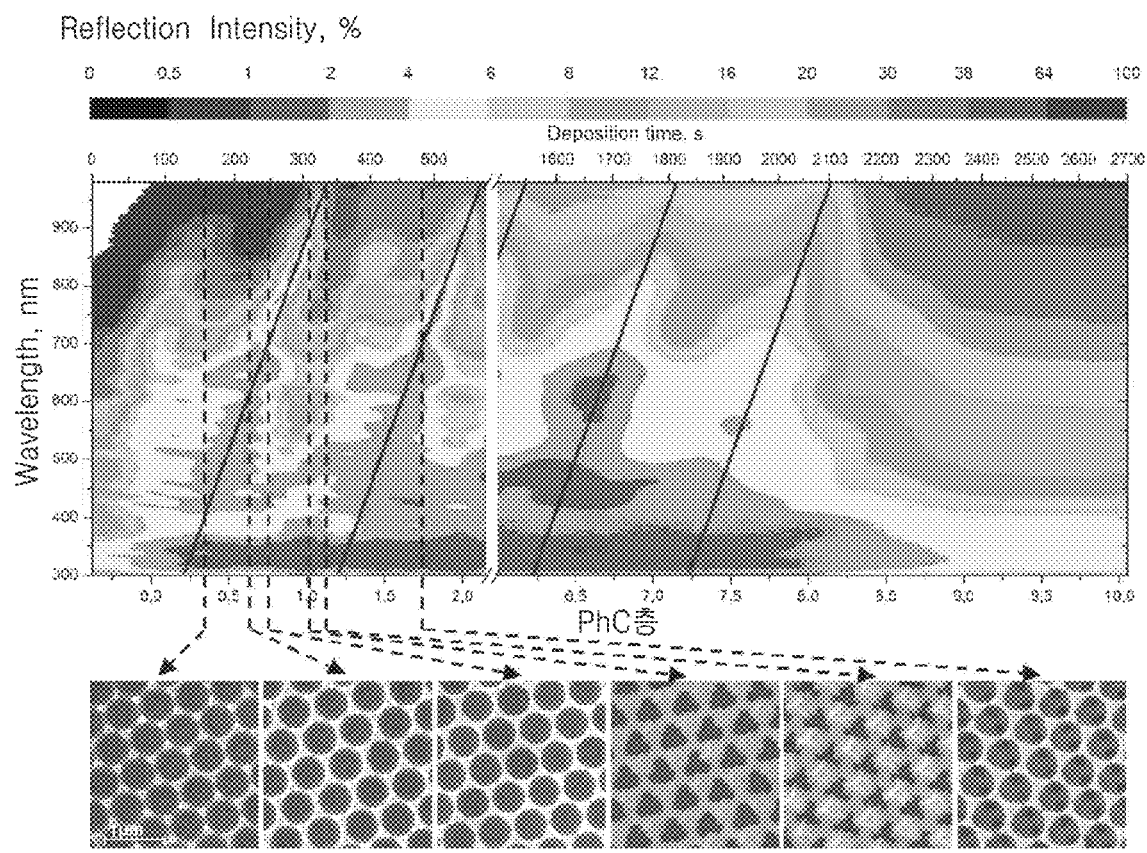
FIGS. 2A and 2B show reflection spectrums and Scanning Electron Microscopy (SEM) images of nickel inverted opals, which are obtained while nickel is electro-deposited in pores of a synthetic colloidal crystal, according to an embodiment.
Figure 2B:
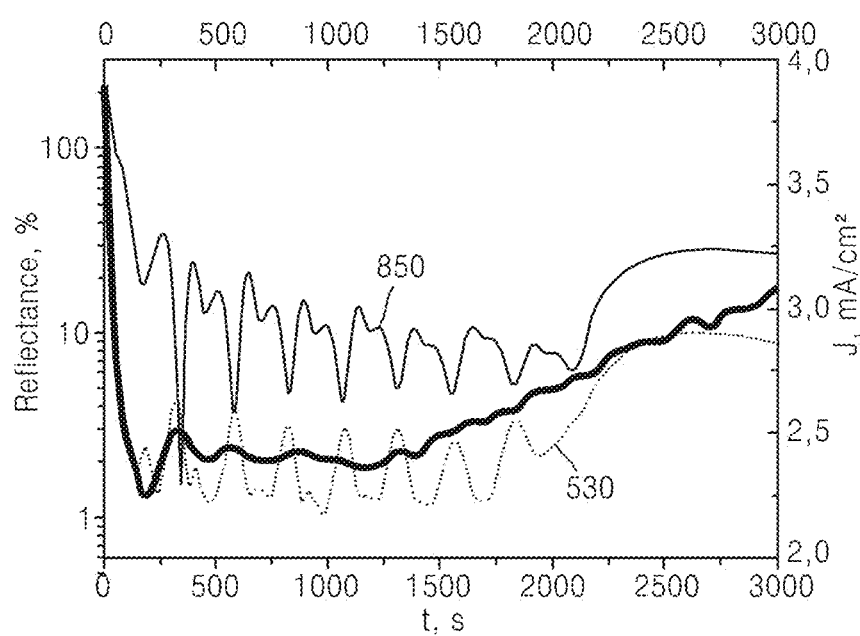

FIGS. 2A and 2B show reflection spectrums and Scanning Electron Microscopy (SEM) images of a nickel inverted opal film, which are obtained while nickel is electro-deposited in pores of synthesized opals, according to an embodiment. In more detail, FIG. 2A shows a reflection spectrum of a nickel inverted opal during a deposition time in which metal is electro-deposited in hollows of a colloidal crystal film, and SEM images at different growth stages of the nickel inverted opal film. In FIG. 2B, a bold line indicates a typical excessive current while metal is electro-deposited in hollows of a colloidal crystal template. Referring to FIGS. 2A and 2B, an interference pattern that is changed during deposition is observed on the reflection spectrum, and the interference pattern is used to define a cut level of the closest face-centered cubic packing of microspheres in a plane within a layer of the magnetic inverted photon crystal. The heterogeneity of the cut level of an external layer of the magnetic inverted photon crystal on the irradiated area is detected by broadening interference bands.

The deposition is stopped when a necessary thickness of the magnetic inverted photon crystal is achieved, and microspheres are dissolved in heptane or toluene (in case of the polystyrene colloidal crystal) or an alkali diluted solution (in case of the colloidal crystal of silicon dioxide).

Since the metal inverted opal according to embodiments has several layers, depth of light penetration and optical properties of such structures differ from properties of the inverted opals made from optically transparent materials.

FIG. 1 shows the scheme of occurrence of a magneto-optical Kerr effect for the structured surface of the magnetic inverted opal in equatorial geometry with excitation of localized and delocalized surface plasmons, according to an embodiment. In FIG. 1, a reference number 10 indicates surface (Bragg) plasmons that are excited on a surface of a periodic metal structure, and a reference number 20 indicates localized (Mi) plasmons. The polaritons of the surface plasmons 10 represent oscillations of an electronic gas in a neighborhood of a surface of the metal, penetrating deep into metal on distances of the order of a skin-layer, and the polaritons of the Mi plasmons 20 are excited in spherical hollows in metal. Here, the surface plasmons 10 or the Mi plasmons 20 are excited most effectively depending on morphology of an external surface. Thus, excitation of only the Bragg surface plasmons 10 should occur on a surface of the nickel inverted opal with a cut level t=0.1 (t=d/2R where d indicates a depth of a pore, and R indicates a pore radius), whereas at t=0.9, a prevailing type of plasmons (excited plasmons) is the localized Mi plasmons 20, and at t=0.6, both of the surface plasmons 10 and the Mi plasmons 20 are excited (refer to FIGS. 3 and 4). Also, with respect to various cut levels, a change of an energy position of modes of the Mi plasmons 20 is characteristic, whereas the position of the Bragg surface plasmons 10 remains almost invariable (refer to FIGS. 2A and 2B).

The maximum amplification of the magneto-optical Kerr effect is observed at a cut level t=0.5 of an external layer of the magnetic inverted photon crystal at a wavelength of incident irradiation which corresponds to the excitation of Bragg plasmons.

Figure 5A:
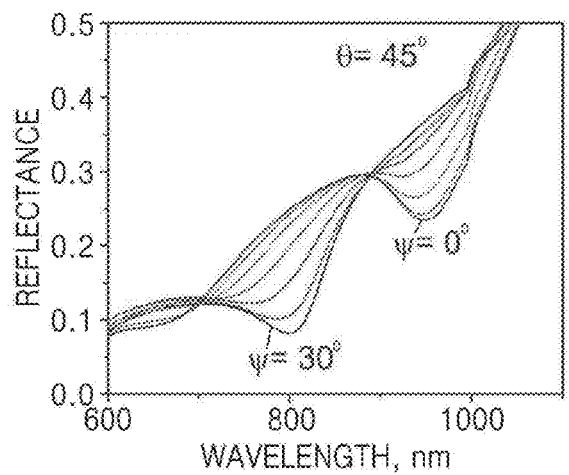
FIGS. 5A and 5B respectively show a reflection spectrum and a TMOKE spectrum of the nickel inverted opal with a cut level of t=0.6 with respect to an incidence angle of $\theta=45°$ and various lateral angles $\psi=0°, \ldots, 30°$ with step 5°, according to an embodiment.
Figure 5B:
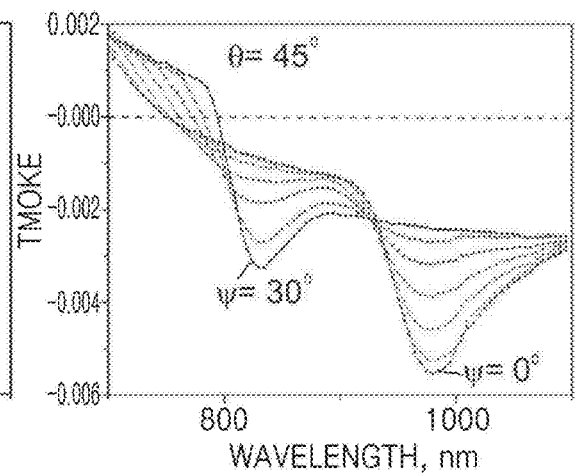

FIGS. 5A and 5B respectively show a reflection spectrum and a Transverse Magneto-Optical Kerr Effect (TMOKE) spectrum of the nickel inverted opal with a cut level of t=0.6 with respect to an incidence angle of $\theta=45°$ and various lateral angles $\psi=0°, \ldots, 30°$ with step 5°, according to an exemplary embodiment. Referring to FIGS. 5A and 5B, it is noted that the spectroscopic position of modes of surface plasmons 10 and Mi plasmons 20 depends on both of an incidence angle and a lateral angle of light, which may be used for fine-tuning of a strip of amplification of a magneto-photon effect by the magnetic inverted photon crystals. Magnetic photon crystals with a cut level equal to a half period of a structure are characterized by amplification of a TMOKE more than 5 times.

The example according to the present exemplary embodiment was achieved by using nickel inverted opals.

Specifically, according to an embodiment, films of the nickel inverted opals were obtained by electrodeposition in small pores of synthetic opal. Artificial opal was synthesized by a method in which the polystyrene microspheres (diameter d=600 nanometers, distribution by the size no more than 10%) at the application of the potential are vertically deposited on a silicon substrate (100) with a sprayed layer of gold having the thickness of 200 nanometers. The electrodeposition was performed at room temperature in a three-electrode cell from an electrolyte composed of 0.6M NiSO$_4$+0.1M NiCl$_2$+0.3M H$_3$BO$_3$+3.5M C$_2$H$_5$OH in a potentiostatic mode at a potential −0.92 volt. A saturated silver-chlorine (Ag/AgCl) electrode connected with a cell by using a Luggin capillary was used as a reference electrode. The deposition was stopped when a desired thickness of the magnetic inverted photon crystal was achieved, and microspheres were dissolved in toluene.

Measurement of a magneto-optical Kerr effect was executed in an equatorial geometry, i.e. a change in intensity and a phase of a reflected wave from a magnetized medium occurred at a magnetization vector, perpendicular to planes of incidence and lying in a plane of the sample, made in a variable saturating by amplitude B=1.5 kilogauss magnetic field by a method of synchronous detection on area of ~2 mm. A value of the TMOKE was defined as the relative change of a reflectivity at magnetization, TKE=(R$_m$−K$_m$)/2R$_0$, where R$_m$ and K$_m$ indicate reflection coefficients of a medium in opposite directions of magnetization, and R$_0$ indicates a reflection coefficient in conditions that lack an external magnetic field (residual magnetization).

Figure 3:
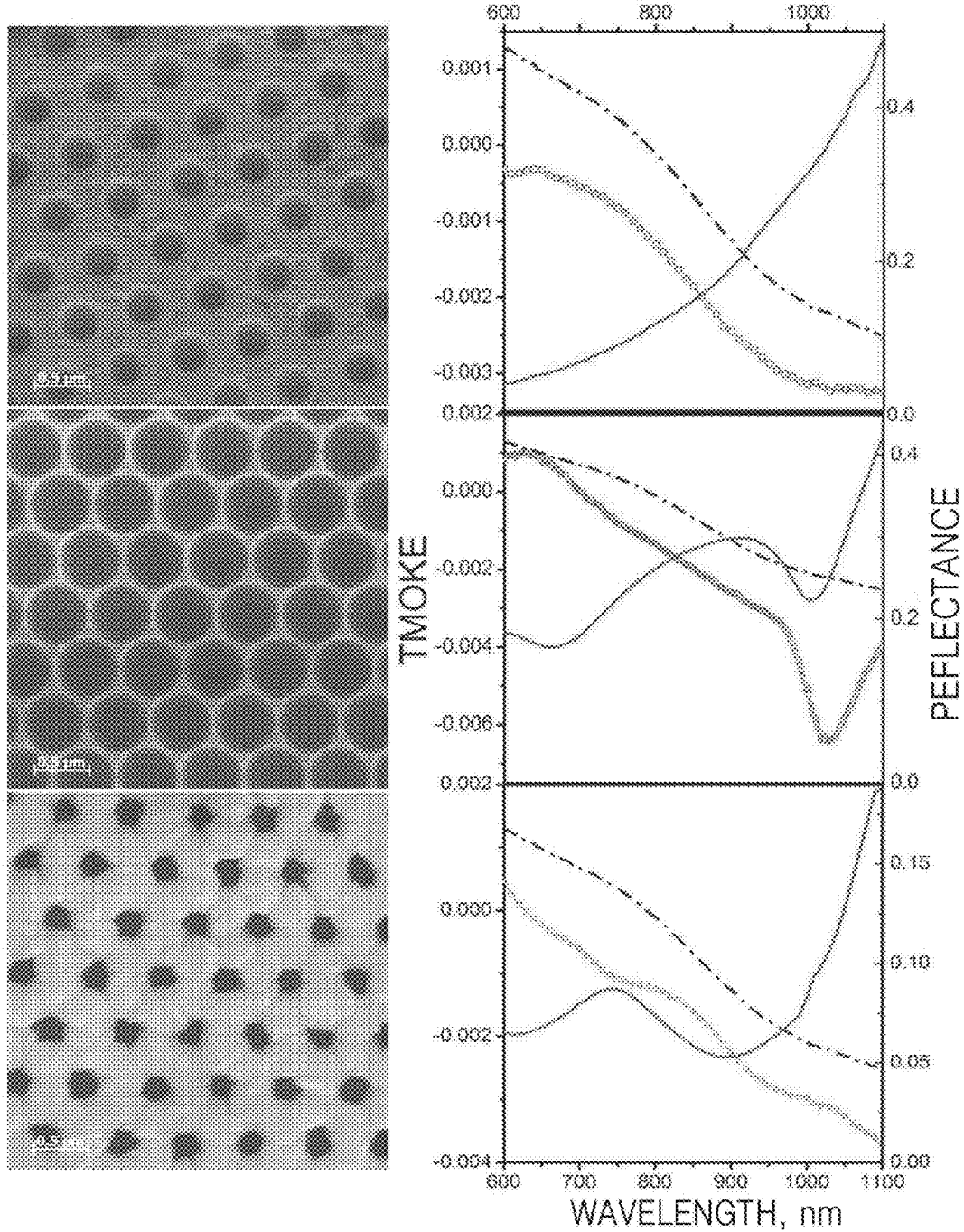
FIG. 3 shows reflection spectrums and Transverse Magneto-Optical Kerr Effect (TMOKE) spectrums with respect to unstructured films formed of a photon crystal film and nickel which have different thicknesses, according to an embodiment.

FIG. 3 shows reflection optical spectrums and TMOKE spectrums with respect to unstructured films formed of a photon crystal film and nickel which have different thicknesses, according to an embodiment. In FIG. 3, an upper-left image indicates an SEM image of a nickel inverted opal film with a cut level t=0.1, a middle-left image indicates an SEM image of a nickel inverted opal film with a cut level t=0.6, and a lower-left image indicates an SEM image of a nickel inverted opal film with a cut level t=0.9. Also, in FIG. 3, an upper-right graph indicates a reflection spectrum and a TMOKE spectrum of the nickel inverted opal film with a cut level t=0.1, a middle-right graph indicates a reflection spectrum and a TMOKE spectrum of the nickel inverted opal film with a cut level t=0.6, and a lower-right graph indicates a reflection spectrum and a TMOKE spectrum of the nickel inverted opal film with a cut level t=0.9. Here, an incidence angle θ is 60° and a lateral angle ψ is 0°. In the graphs of FIG. 3, chain-lines indicate the TMOKE spectrums, i.e., spectroscopic dependences of values of an equatorial magneto-optical Kerr effect of the nickel inverted opal films, and solid lines indicate the reflection spectrums of the nickel inverted opal films. In the graphs of FIG. 3, a TMOKE spectrum of a non-structured nickel film is illustrated as a black dashed line for comparison.

Referring to FIG. 3, the reflection spectrums undergo significant changes during an electrodeposition process as a result of a change in an energy position of modes of both Bragg plasmons 10 and Mi-plasmons 20 with respect to various cut levels. Also, referring to FIG. 3, it is possible to see that excitation of only Bragg surface plasmons 10 occurs on a surface of the nickel inverted opal with the normalized thickness t=0.1 (t=d/2R where d indicates a depth of a pore, and R indicates a pore radius), at t=0.9, a prevailing type of plasmons are the localized Mi plasmons 20, and at t=0.6, both surface plasmons 10 and Mi-plasmons 20 are excited. It is apparent via FIG. 3 that amplification of a Kerr effect is observed at photon crystals in connection with excitation of mixed plasmons. Excitation of localized plasmons 20 does not lead to serious changes in values of the equatorial magneto-optical Kerr effect.

Figure 4:
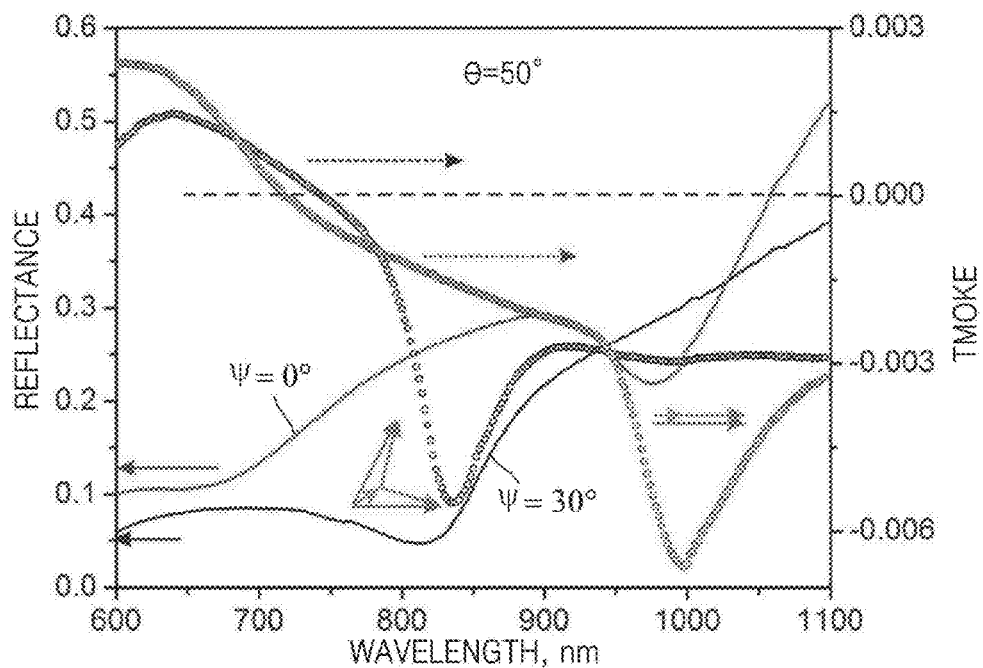
FIG. 4 shows a reflection spectrum and a TMOKE spectrum of a nickel inverted opal film at an incidence angle of $\theta=50°$ and a lateral angle $\psi=0°$ and $\psi=30°$, according to an embodiment.

FIG. 4 shows reflection spectrums and TMOKE spectrums of a nickel inverted opal film at an incidence angle θ=50° and lateral angles ψ=0° and ψ=30°, according to an embodiment. The TMOKE spectrums may represent spectroscopic dependences of an equatorial magneto-optical Kerr effect. Null levels of TMOKE values are illustrated as a wavy line. Arrows represent conditions of excitation of delocalized plasmons at lateral angles ψ=0° and ψ=30°. The spectrum reflects an increase of a Kerr effect in the field of Wood's anomaly in comparison with non-structured nickel.

Thus, the aforementioned method allows an equatorial magneto-optical Kerr effect to be amplified by at least 5 times by using magneto-photon materials.

In the exemplary embodiments described above, the nickel inverted opal film is formed of magnetic inverted photon crystal. However, according to other embodiments, magnetic inverted photon crystals may consist of Ni, Co, Fe or alloys containing these metals.

The embodiments provide a photon crystal material with a magneto-optical Kerr effect that is amplified by at least 5 times, and in this regard, the photon crystal material is industrially applicable and can be used in the manufacture of optoelectronic devices to be controlled by a magnetic field.

While the embodiments have been particularly shown and described, it will be understood by those of ordinary skill in the art that various changes in form and details may be made therein without departing from the spirit and scope of the embodiments as defined by the following claims.

What is claimed is:

1. A method of amplifying a magneto-optical Kerr effect, the method comprising:
fabricating a magnetic photon crystal comprising a crystal magnet having a periodically-structured surface, the magnetic photon crystal having a cut level equal to a half period of the periodically-structured surface of the crystal magnet, and
amplifying a magneto-optical Kerr effect by using the periodically-structured surface of the crystal magnet.

2. The method of claim 1, wherein the crystal magnet comprises a magnetic inverted photon crystal.

3. The method of claim 2, wherein the magnetic photon crystal has a structure of an inverted colloidal crystal with a structure period of 250 to 1900 nanometers.

4. The method of claim 3, wherein surface morphology of the magnetic photon crystal is determined by a cut level of a closest face-centered cubic packing of microspheres in a plane within a layer of the inverted colloidal crystal.

5. The method of claim 4, wherein the fabricating of the magnetic photon crystal is performed by using a template method comprising performing metal electrodeposition on pores of synthetic opal and removing the synthetic opal.

6. The method of claim 5, wherein the magnetic photon crystal is a film with a thickness of 0.1 to 60 micrometers.

7. The method of claim 5, wherein the magnetic inverted photon crystal consists of Ni, Co, Fe or alloys containing Ni, Co, or Fe.

8. The method of claim 5, wherein a degree of filling metal into the pores of the synthetic opal exceeds 95%.

9. The method of claim 5, wherein a structure of the magnetic inverted photon crystal is controlled by using a reflection spectroscopy device during the metal electrodeposition.

10. The method of claim 5, wherein heterogeneity of a cut level of an external layer of the magnetic photon crystal within a layer does not exceed 10% of the structure period in one square centimeter.

11. The method of claim 10, wherein a maximal reflection position in spectrums of the magnetic photon crystal within a range of 300 to 2000 nanometers is determined by surface morphology of an external layer of the magnetic photon crystal and linearly increases with magnification of the cut level of the closest face-centered cubic packing of microspheres within the layer of the colloidal crystal.

12. The method of claim 10, wherein the cut level equal to the half period of the periodically-structured surface of the crystal magnet achieves over 5-fold amplification of an equatorial magneto-optical Kerr effect.

13. A magnetic photon crystal comprising:
a crystal magnet that has a magnetic inverted photon crystal and amplifies a magneto-optical Kerr effect by using a periodically-structured surface of the crystal magnet,
wherein the magnetic inverted photon crystal has a cut level equal to a half period of the periodically-structured surface of the crystal magnet.

14. The magnetic photon crystal of claim 13, wherein the crystal magnet has a structure of an inverted colloidal crystal with a structure period of 250 to 1900 nanometers.

15. The magnetic photon crystal of claim 14, wherein the magnetic photon crystal has surface morphology that is determined by a cut level of the closest face-centered cubic packing of microspheres in a plane within a layer of the inverted colloidal crystal.

16. The magnetic photon crystal of claim 15, wherein the magnetic photon crystal is a film with a thickness of 0.1 to 60 micrometers.

17. The magnetic photon crystal of claim 15, wherein heterogeneity of a cut level of the layer of the magnetic photon crystal within the layer does not exceed 10% of the structure period in one square centimeter.

18. The magnetic photon crystal of claim 17, wherein a maximal reflection position in spectrums of the magnetic photon crystal within a range of 300 to 2000 nanometers is determined by surface morphology of an external layer of the magnetic photon crystal and linearly increases with magnification of the cut level of the closest face-centered cubic packing of microspheres within the layer of the inverted colloidal crystal.

19. The magnetic photon crystal of claim 17, wherein the cut level equal to the half period of the periodically-structured surface of the crystal magnet achieves over 5-fold amplification of an equatorial magneto-optical Kerr effect.

20. The magnetic photon crystal of claim 13, wherein the crystal magnet consists of Ni, Co, Fe or alloys containing Ni, Co, Fe.

21. A method of fabricating a magnetic photon crystal, the method comprising:
forming a colloidal crystal;
performing metal electrodeposition on pores of the colloidal crystal; and
removing the colloidal crystal and thus forming a crystal magnet having a structure of an inverted colloidal crystal,
wherein a magneto-optical Kerr effect is amplified by using a periodically structured surface of the crystal magnet, and
wherein the magnetic photon crystal has a cut level equal to a half period of the periodically structured surface of the crystal magnet.

22. The method of claim 21, wherein the inverted colloidal crystal has a structure period of 250 to 1900 nanometers.

23. The method of claim 21, wherein the magnetic photon crystal has surface morphology that is determined by a cut level of a closest face-centered cubic packing of microspheres in a plane within a layer of the inverted colloidal crystal.

24. The method of claim 23, wherein the magnetic photon crystal is a film with a thickness of 0.1 to 60 micrometers.

25. The method of claim 23, wherein heterogeneity of a cut level of the layer of the magnetic photon crystal within the layer does not exceed 10% of the structure period in one square centimeter.

26. The method of claim 23, wherein a maximal reflection position in spectrums of the magnetic photon crystal within a range of 300 to 2000 nanometers is determined by surface morphology of an external layer of the magnetic photon crystal and linearly increases with magnification of the cut level of the closest face-centered cubic packing of microspheres within the layer of the inverted colloidal crystal.

27. The method of claim 23, wherein the cut level equal to the half period of the periodically structured surface of the crystal magnet achieves over 5-fold amplification of an equatorial magneto-optical Kerr effect.

28. The method of claim 21, wherein the crystal magnet consists of Ni, Co, Fe or alloys containing Ni, Co, Fe.

* * * * *